United States Patent
Sims et al.

(10) Patent No.: US 8,169,806 B2
(45) Date of Patent: May 1, 2012

(54) POWER CONVERTER SYSTEM WITH PULSED POWER TRANSFER

(75) Inventors: Nicholas A. Sims, San Francisco, CA (US); Jeffrey Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 585 days.

(21) Appl. No.: 12/370,507

(22) Filed: Feb. 12, 2009

(65) Prior Publication Data

US 2010/0202159 A1    Aug. 12, 2010

(51) Int. Cl.
*H02M 3/24* (2006.01)

(52) U.S. Cl. .......................................... 363/97; 323/284

(58) Field of Classification Search ............... 363/21.02, 363/21.03, 21.08, 21.07, 21.12, 97, 98, 131, 363/49, 50; 323/222, 224, 272, 266, 282–290
See application file for complete search history.

(56) References Cited

U.S. PATENT DOCUMENTS

| | | | |
|---|---|---|---|
| 5,612,609 A | 3/1997 | Choi | |
| 5,642,267 A | 6/1997 | Brkovic et al. | |
| 5,737,706 A | 4/1998 | Seazholtz et al. | |
| 6,212,079 B1 * | 4/2001 | Balakrishnan et al. | 363/21.03 |
| 6,215,288 B1 | 4/2001 | Ramsey et al. | |
| 7,019,988 B2 * | 3/2006 | Fung et al. | 363/21.01 |
| 7,030,596 B1 | 4/2006 | Salerno et al. | |
| 7,738,266 B2 * | 6/2010 | Jacques et al. | 363/21.02 |

OTHER PUBLICATIONS

Terlizzi et al., U.S. Appl. No. 12/239,345, filed Sep. 26, 2008.

* cited by examiner

*Primary Examiner* — Rajnikant Patel
(74) *Attorney, Agent, or Firm* — Treyz Law Group; G. Victor Treyz; Chih-Yun Wu

(57) ABSTRACT

Electronic devices such as portable electronic devices are provided. Power converters are provided that convert alternating-current power into direct-current power for powering the electronic devices. A power converter may rectify an alternating current line signal to produce a rectified alternating current signal having peaks and valleys. The power converter may have a capacitor and transformer coupled across the rectifier circuit. Power regulation switching circuitry in the power converter or the electronic device may regulate how much power is delivered to the electronic device. Relatively more power may be delivered during the peaks in the rectified signal than during the valleys. Pulsed power delivery may be controlled using control resources in the power converter, in the electronic device, or in both the power converter and electronic device.

24 Claims, 13 Drawing Sheets

POWER CONVERTER SYSTEM WITH PULSED POWER TRANSFER

BACKGROUND

This invention relates to electronic devices and power converter circuits for electronic devices.

Alternating current (AC) power is typically supplied from wall outlets and is sometimes referred to as line power. Electronic devices include circuitry that runs from direct current (DC) power. Power converter circuitry is used to convert AC power to DC power. The DC power that is created in this way may be used to power an electronic device. The DC power that is created may also be used to charge a battery in an electronic device.

In some applications, AC to DC power converter circuitry may be incorporated into an electronic device. For example, desktop computers often include AC to DC power converter circuitry in the form of computer power supply units. A computer power supply unit has a socket that receives an AC power cord. With this type of arrangement, the AC power cord may be plugged directly into the rear of the computer to supply AC power without using an external power converter.

Although desktop computers are large enough to accommodate internal power supplies, other devices such as handheld electronic devices and portable computers are not. As a result, typical handheld electronic devices and laptop computers require the use of external power converters. When untethered from the power converter, a handheld electronic device or portable computer may be powered by an internal battery. When AC line power is available, the power converter is used to convert AC power into DC power for the electronic device.

Because users must often carry their power converters with them when they travel, it is generally desirable to make power converters as small as possible. Power converters that are too bulky may be unsightly and difficult to transport.

Despite the benefits of minimizing the size of power converters, it can be difficult to implement power converter size reductions in practical designs. Popular power converter designs typically include inductive components such as transformers, other electrical components such as capacitors and control circuitry, and passive components such as connectors. Components are typically mounted on a printed circuit board.

The size of a power converter can be minimized by minimizing the size of its components. Unfortunately, size reductions, although desirable, may be impractical for many applications. For example, it can be costly to reduce the size of transformer components, because small transformer designs tend to rely on exotic and expensive materials. It is sometimes not acceptable to use connectors of reduced size because of a need to preserve compatibility with existing hardware. Capacitors with specialized designs might permit size reductions, but are generally cost prohibitive. Capacitors with conventional designs may be used that exhibit smaller capacitance values and consume less space, but this tends to lead to power supply inefficiencies.

In view of these considerations, it would be desirable to provide improved power converter systems for electronic devices.

SUMMARY

An electronic device may be powered using a switched-mode power converter. The power converter may convert alternating-current power into direct-current power. A direct-current signal from the output of the power converter may be conveyed to the electronic device over a pair of power lines. Signals lines may also be coupled between the power converter and the electronic device.

During operation of the power converter and electronic device, the alternating-current signals received by the power converter from an alternating current line source are rectified by the power converter to produce a rectified alternating-current signal that has peaks and valleys. A capacitor and transformer in the power converter may bridge the rectifier circuit. The capacitor may smooth the rectified alternating-current signal to minimize ripple. The smoothed version of the alternating-current signal will nevertheless contain ripple that will lead to corresponding ripple in the direct-current signal at the power converter output.

To allow the capacitor to be reduced in size or to deliver more power for a given capacitor size, power conversion inefficiencies may be minimized by restricting the time periods during which power is delivered to those periods that overlap the peaks in the rectified alternating-current signal and the corresponding peaks in the direct-current signal provided to the electronic device.

When power delivery is regulated in this way, power delivery may be said to be "pulsed," because during some time periods (pulses) more power is delivered and during other time periods (other pulses) less power is delivered. Pulsed power delivery can be controlled using resources in the power converter, resources in the electronic device, or resources in both the power converter and the electronic device operating in cooperation.

In schemes in which the power converter is responsible for regulating power delivery, a line monitoring circuit in the power converter may be used to gather timing information for the peaks and valleys in the rectified version of the alternating-current signal. The power converter can then apply appropriate pulse-width modulation control signals to switching circuitry in the power converter that adjusts the amount of power that is delivered accordingly. During time periods that coincide with the peaks in the rectified alternating-current signal, a relatively larger amount of power may be delivered. During time periods that coincide with the valleys in the rectified alternating-current signal, a relatively lower amount of power may be delivered.

In schemes in which the electronic device is responsible for regulating power transfer between the power converter and the electronic device, a ripple detector in the electronic device may be used to detect the location of the peaks and valleys in the direct-current signals received from the power converter. These peaks and valleys correspond to the peaks and valleys in the rectified alternating-current signal in the power converter and may therefore be used in regulating power draw by the electronic device. During peaks, power draw by the electronic device may be maintained at a relatively high level. During valleys, power draw may be reduced.

A cooperative scheme may be implemented in which the power converter sends beacons to the electronic device to alert the electronic device to the locations of the signal peaks and valleys. If desired, the power converter may send time-stamped information on the peak and valley locations to the electronic device.

During the time periods in which power delivery is reduced, power delivery can be maintained at a low non-zero level or may be halted completely (i.e., power delivery can be maintained at a zero level in which no power is supplied).

Further features of the invention, its nature and various advantages will be more apparent from the accompanying drawings and the following detailed description of the preferred embodiments.

DETAILED DESCRIPTION

Figure 1:
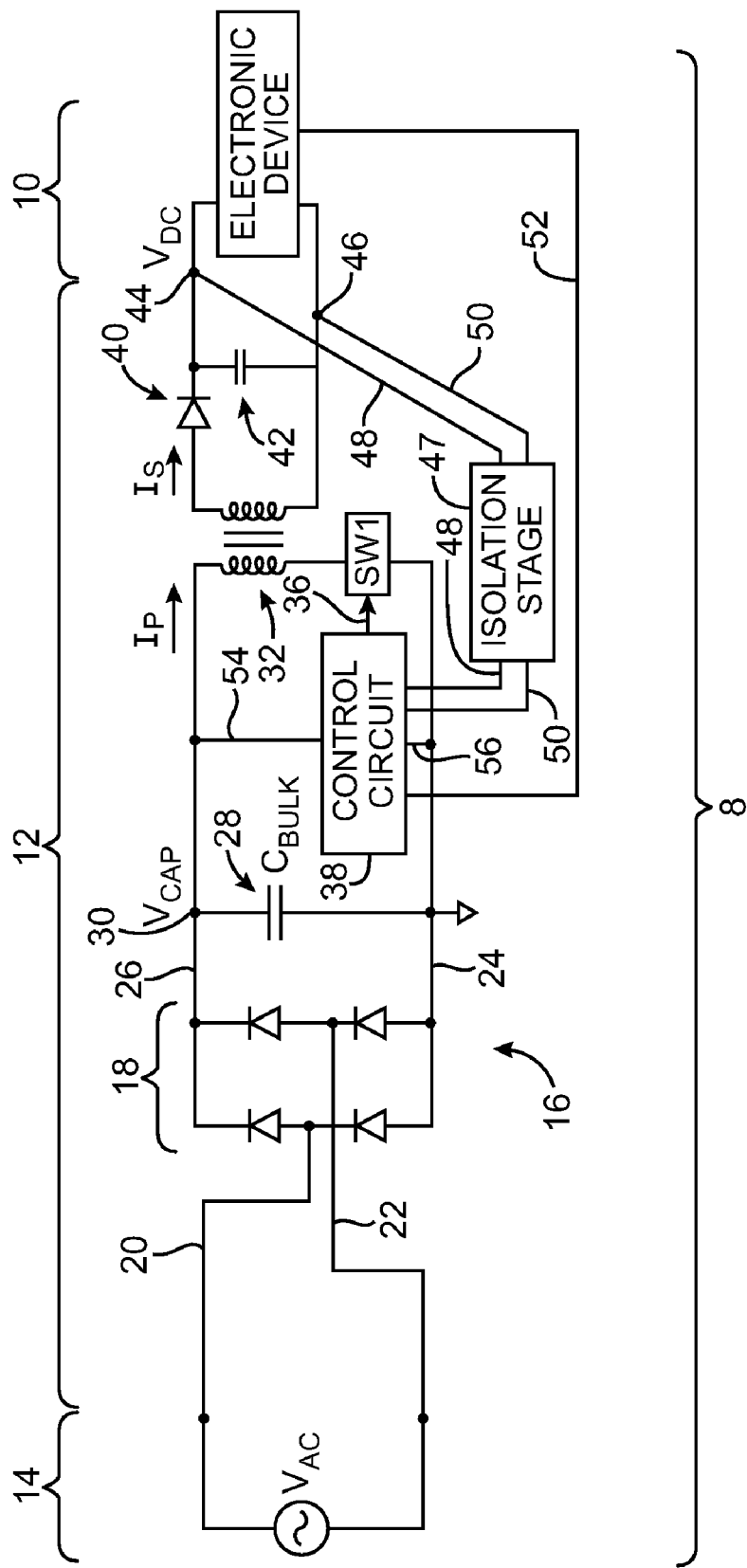
FIG. 1 is a schematic view of a system including a power converter and an electronic device in accordance with an embodiment of the present invention.

The present invention relates to power converters and electronic devices that are powered by power converters.

Power converters, which are sometimes referred to as power adapters, are used to convert power levels and types. For example, a power converter may be used to boost or reduce a direct-current (DC) power level. Power converters may also be used to convert alternating current (AC) power into DC power. Power converters that are used in converting AC power to DC power are sometimes described herein as an example.

In a typical scenario, a power converter may be plugged into source of AC line power such as a wall outlet. The AC power source may provide power at 120 volts or 240 volts (as examples). Circuitry in the power converter may convert the AC line power that is received into DC power. For example, an AC to DC power converter may receive AC line power at an input and may supply DC power at a corresponding output. The output voltage level may be 12 volts, 5 volts, or other suitable DC output level.

The circuitry in the power converter may be based on a switched mode power supply architecture. Switched mode power supplies use switches such as metal-oxide-semiconductor power transistors and associated control schemes such as pulse-width modulation control schemes to implement power conversion functions in relatively compact circuits. When the switching circuitry has a first configuration, power is transferred from a power source to a storage element such as an inductor or capacitor. When the switching circuitry has a second configuration, power is released from the storage element into a load. Feedback may be used to regulate the power transfer operation (e.g., to ensure that the output voltage is at a desired level). Examples of switched mode power supply topologies that may be used in a power converter include buck converters, boost converters, flyback converters, etc.

With one suitable arrangement, which is described herein as an example, an AC to DC power converter may be implemented using a voltage rectifier and flyback converter. The voltage rectifier converts AC line power into DC power at a relatively high voltage level. The flyback converter portion of the power converter steps down the DC power at the output of the rectifier circuit to 12 volts, 5 volts, or other suitably low level for operating circuitry in an electronic device. If desired, other power converter architectures may be used. The use of a switched mode power converter arrangement that is based on a flyback converter design is described herein as an example.

An AC to DC power converter may supply DC power to any suitable electronic device. Examples of an electronic device that may receive DC power from an AC to DC power converter include a handheld computer, a miniature or wearable device, a portable computer, a desktop computer, a router, an access point, a backup storage device with wireless communications capabilities, a mobile telephone, a music player, a remote control, a global positioning system device, and a device that combines the functions of one or more of these devices. With one suitable arrangement, which is sometimes described herein as an example, the electronic device that receives power from the AC to DC converter is a compact portable device such as a handheld electronic device (e.g., a mobile telephone or music player). This is, however, merely illustrative. The AC to DC power converter may be operated in conjunction with any suitable electronic device.

An illustrative system environment in which a power converter may provide power to an electronic device is shown in FIG. 1. As shown in FIG. 1, system 8 may include a source of AC power such as AC power source 14, a power converter such as AC to DC power converter 12, and an electronic device such as electronic device 10.

AC power source 14 may be, for example, a standard wall outlet that supplies AC line power via a power cord. Wall outlet power is typically delivered at AC voltages of about 110 volts to 240 volts.

Power converter 12 may be based on a switched-mode power supply design such as a flyback converter (as shown in FIG. 1) or other suitable power converter topology.

Electronic device 10 may have a battery for use in powering device 10 when unattached to power converter 12. When power converter 12 is plugged into AC power source 14 and when electronic device 10 is connected to power converter 12, power converter 12 can transform AC power that is received from AC power source 14 into DC power for device 10.

If desired, connectors may be provided at the input and/or output of power converter 12. For example, device 10 may have a universal serial bus (USB) port into which a USB cable may be plugged. The USB cable may be used to convey DC power and data signals between power converter 12 and electronic device 10. For example, the USB cable may be used to convey a positive DC voltage at 12 volts, 5 volts, or other suitable positive DC voltage level and a ground voltage at 0 volts or other suitable ground voltage level. When connected to power converter 12, electronic device 10 may receive DC power through the power pins of the USB connector and cable (as an example). The data pins of the USB connector and cable may be used to convey other (non-power) signals such as beacon signals and clock synchronization signals. The use of a USB connector to connect power converter 12 and electronic device 10 is, however, merely illustrative. Any suitable plugs, jacks, ports, pins, other connectors, or a hardwired connection may be used to interconnect power converter 12 and electronic device 10 if desired. Similarly, a hardwired connection or a suitable plug, jack, port, pin structure, or other connector may be used to connect power connector to power source 14.

Power converter 12 may have rectifier circuitry 16. Diodes 18 may convert AC voltages on paths 20 and 22 to rectified (positive) signals across lines 24 and 26. The AC voltage on paths 20 and 22 may be sinusoidal and the output of rectifier circuit 16 may be a rectified sinusoid having peaks and valleys. To smooth out the raw rectified output from diodes 18, power converter 12 may include capacitor 28. Capacitor 28 converts the rectified version of the AC signal from source 14 into a DC voltage Vcap on node 30 with a reduced amount of AC ripple.

Transformer 32 may have an input connected to the output of rectifier 16 and an output connected to diode 40 and capacitor 42. Transformer 32 may have a turn ratio such as a 10:1 or 20:1 turn ratio. Switching circuitry SW1 such as a bipolar or metal-oxide-semiconductor power transistor may be used to regulate the current Ip that flows through transformer 32. Switch SW1 may receive a control signal on control input 36. The control signal may have a frequency of about 20 kHz to 100 kHz (as an example). Control circuit 38 may produce the control signal on line 36 to regulate the flow of power through converter 12.

The control signal may be a signal whose frequency is adjusted to control the amount of power that flows through the converter or may be a signal such as a pulse width modulation (PWM) signal whose duty cycle is adjusted to control the amount of power that flows through the converter. The control signal may, as an example, have a high value when it is desired to turn switch SW1 on to permit current Ip to flow and may have a low value when it is desired to turn switch SW1 off to prevent current Ip from flowing. The control signal on line 36 may be a square wave PWM signal whose duty cycle may be regulated by control circuit 38 to adjust the magnitude of VDC, may be a square wave or other control signal whose frequency is regulated by control circuit 38 to adjust the magnitude of VDC (e.g., when implementing a frequency modulation control scheme), etc. The use of PWM control signals in power converters such as power converter 12 is sometimes described herein as an example. The use of PWM control signals is, however, merely illustrative. Any suitable type of control signal may be used to control power flow in converter 12 if desired.

When control circuit 38 applies a control signal such as a PWM control signal to switch SW1, the current Is at the output of transformer 32 will have a frequency equal to that of the control signal (e.g., about 20 kHz to 100 kHz). Diode 40 and capacitor 42 convert this AC signal into a DC voltage Vdc at node 44. The voltage Vdc may be, for example, 12 volts, 5 volts, or other suitable voltage. The voltage Vdc may be used in powering the circuitry of electronic device 10.

Power converter 12 may be controlled using an open-loop control scheme. With this type of arrangement, power converter 12 can apply a predetermined PWM signal (or other control signal) to switch SW1 to produce a desired output level. If desired, a closed-loop control scheme may be used by providing a feedback path FB such as feedback path formed from lines 48 and 50. Feedback path FB may include an isolation stage such as isolation stage 47 to isolate circuitry on the secondary side of transformer 32 from circuitry on the primary side of transformer 32. Isolation stage 47 may be formed from a signal transformer, an optical isolation element, or other suitable electrical isolation circuitry. Using lines 48 and 50, control circuit 38 can receive feedback on the current level of Vdc. If the currently monitored value of Vdc on node 44 is below a desired target Vdc level, the duty cycle of the PWM signal (or the frequency of the control signal) can be increased to increase Vdc accordingly. If control circuit 38 determines that Vdc is too high, the duty cycle of the PWM signal (or the frequency of the control signal) can be decreased to reduce Vdc towards its desired target level.

Lines such as lines 54 and 56 may be used by control circuit 38 to measure the frequency and phase of the AC signal from source 14. Path 52 may include one or more lines and may be used to convey digital and/or analog data signals. These data signals may include control data and information that electronic device 10 and power converter 12 use to synchronize their operation (as examples).

Capacitor 28 may have an associated capacitance Cbulk. Because the size of power converter 12 is influenced by the physical size of capacitor 28, it may be advantageous to minimize the magnitude of Cbulk. This will allow a reduction in the physical size requirements for capacitor 28 when using a given type of capacitor (e.g., a cylindrical electrolytic capacitor). When reducing the size of Cbulk, however, care should be taken not to operate power converter 12 at excessively low voltages Vcap and correspondingly large currents Ip, as these conditions tend to lead to conversion inefficiencies in converter 12 (e.g., increased Ohmic power losses).

Figure 2:
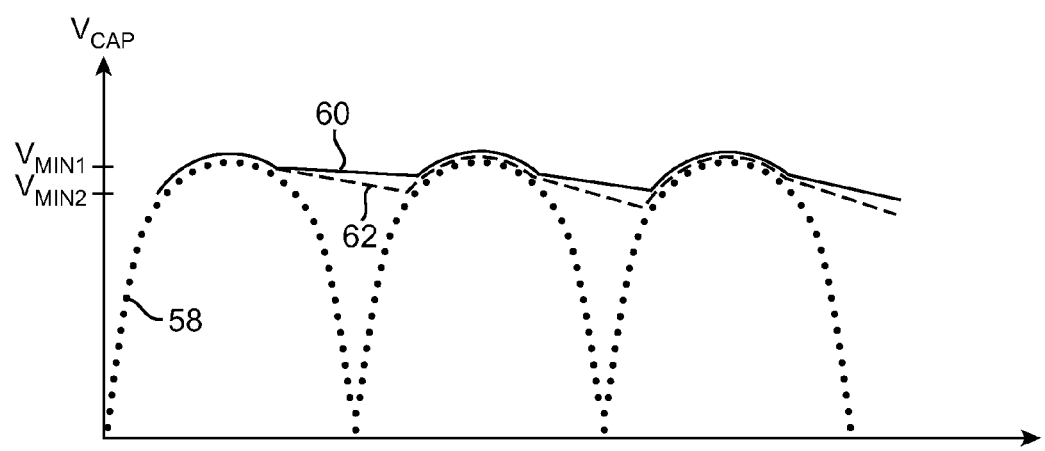
FIG. 2 is a graph showing how capacitor voltage fluctuates as a function of time under various conditions in a conventional power converter.

The evolution of a typical Vcap signal as a function of time for a conventional power converter is shown in FIG. 2. Dotted line 58 corresponds to a rectified version of the AC signal from the AC source. This signal is smoothed by a smoothing capacitor (i.e., a capacitor such as capacitor 28 of FIG. 1). When a conventionally sized smoothing capacitor is used, the smoothed capacitor voltage Vcap will be represented by line 60. As shown in FIG. 2, the lowest voltage that line 60 achieves is Vmin1. Conventionally, smaller values of capacitance cannot be used, because doing so would cause the capacitor voltage to follow trace 62, leading to excessively low minimum capacitor voltage Vmin2 and associated large transformer currents and large conversion inefficiencies. Conventional power converters therefore use smoothing capacitors that are relatively large. This places a lower limit on the physical size of the power converter.

To address this constraint and allow for use of a potentially smaller capacitor or more power production from a capacitor of a given size, the power that is produced by power regulator 12 (FIG. 1) may be provided in alternating high power and low power pulses. As shown in the upper trace of FIG. 3, high power delivery periods T1 are concentrated around peaks PK in the rectified AC line voltage signal represented by dotted line 64. During these time periods, the voltage Vcap (solid line 66) is at its highest. Low power delivery periods T2 are concentrated around the lower portions of the AC signal and Vcap signal (i.e., valleys VL in the rectified AC signal and Vcap signal). During the high power delivery periods, Vcap is high and power converter 12 will operate efficiently. During low power delivery periods, power converter 12 and electronic device enter a lower power delivery regime. A reduced amount of power is delivered during periods T2, so the capacitor voltage Vcap of line 66 drops only to Vm1. In the absence of the reduced amount of power delivery (i.e., if the power delivery rate were to remain constant), Vcap would decrease to the undesirably low value of Vm2, as indicated by dashed line 68. If desired, power delivery can be halted completely during the low power periods T2, in which case Vcap will decrease even less during periods T2 (i.e., line 66 will be nearly flat during periods T2). Thus, the slope of line 66 can be reduced (and even flattened) by using a reduced amount of power during periods T2. During portions of the power delivery process in which power is drawn primarily from capacitor 28 rather than from line source 14 (e.g., time periods near the lowest parts of valleys VL), the reduction in the amount of power being drawn can help prevent excessive lowering of Vcap.

Figure 3:
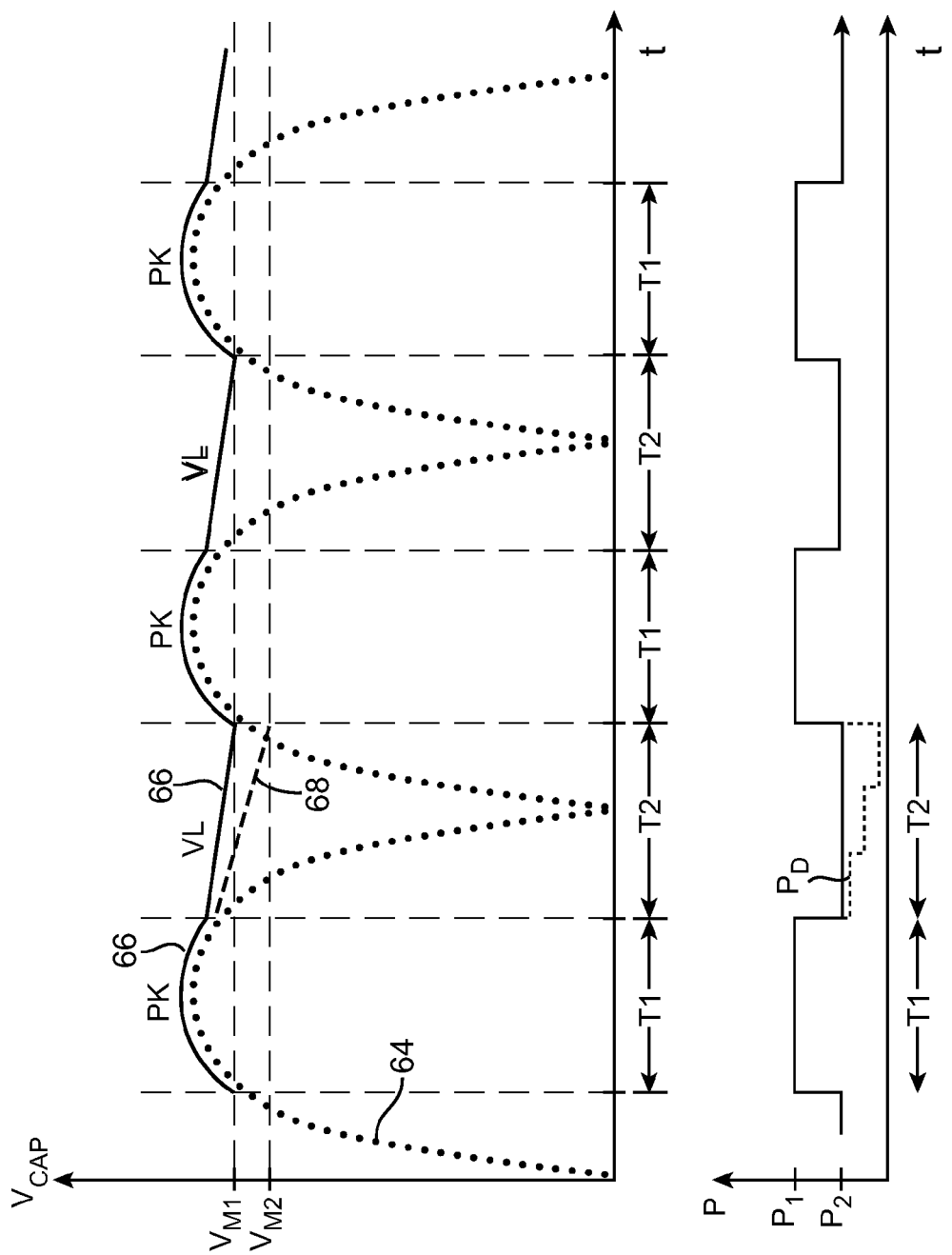
FIG. 3 is a graph showing how power converter capacitor voltages fluctuate as a function of time under various conditions and how switching circuitry in the power converter can be adjusted to deliver relatively more power near peak capacitor voltages in accordance with an embodiment of the present invention.

The lower trace in FIG. 3 shows how, with one suitable arrangement, a relatively larger amount of power P1 may be delivered during high-power period T1 and a relatively lower amount of power P2 may be delivered during low-power period T2. Dashed line PD shows how there may be more than one power level associated with a given power delivery period. For example, there may be one, two, three, or more than three power delivery levels associated with a given power delivery period. In the example shown in the lower trace of FIG. 3, power delivery period T2 has three associated reduced-power power delivery levels. This is, however, merely illustrative. Power delivery periods such as T1 and T2 may have any suitable number of associated discrete or continuously varying power delivery levels. Moreover, there may be more than two different types of power delivery period (e.g., there may be three or more different power delivery periods, each synchronized with a different portion of the AC cycle).

Power delivery levels can be adjusted for various portions of the AC cycle to improve converter efficiency, to reduce component requirements, to reduce component sizes, etc. These benefits may be obtained by eliminating potentially inefficient high-voltage regimes associated with peaks PK in which field-effect-transistor switching losses may dominate, by eliminating or reducing power delivery during all or some of the valleys VL where high currents may lead to undesired losses, etc. Illustrative configurations in which power is delivered in high-power and low-power pulses so as to avoid inefficiencies that may be associated with operating converter 12 at the low voltages Vcap associated with valleys VL are sometimes described herein as an example. In general, however, power delivery levels can be controlled with any suitable amount of granularity to satisfy any desired design criteria.

Pulsed power delivery schemes can be implemented using control resources that reside exclusively in power converter 12, using control resources that reside exclusively in electronic device 10, or using distributed control schemes in which control circuitry in both power converter 12 and electronic device 10 is involved in conveying pulsed power between power converter 12 and electronic device.

In schemes in which control resources reside exclusively in power converter 12, power converter 12 can detect the location of peaks PK (and valleys VL) using control circuitry 38. Control circuitry 38 can then control switching circuitry SW1 so that a larger amount of power is delivered during the time periods T1 (i.e., the periods that overlap and are concentrated around peaks PK) than is delivered during time periods T2 (i.e. the periods that are concentrated around valleys VL and that lie between peaks PK).

Figure 4:
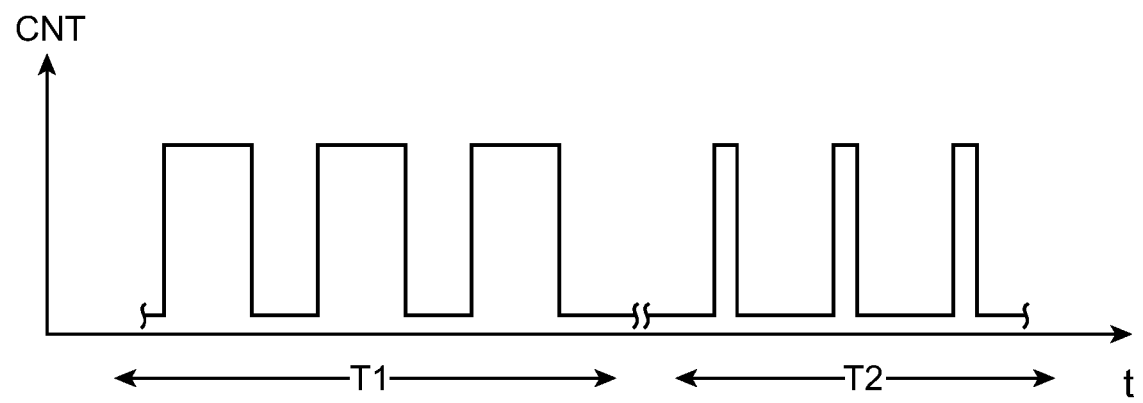
FIG. 4 is a graph showing illustrative pulse-width modulation control signals that may be used in placing power converter circuitry in a high power or low power mode during alternating time periods in accordance with an embodiment of the present invention.

As illustrated in the graph of FIG. 4, the PWM control signals CNT may be made up of relatively wide control pulses during time period T1 (i.e., control pulses with a relatively large duty cycle) and may be made up of relatively narrow control pulses (i.e., control pulses with a relatively small duty cycle) during time period T2. With this type of arrangement, a higher amount of power will be conveyed through transformer 32 into device 10 during periods T1 and a lower amount of power will be conveyed through transformer 32 into device 10 during periods T2.

Figure 5:
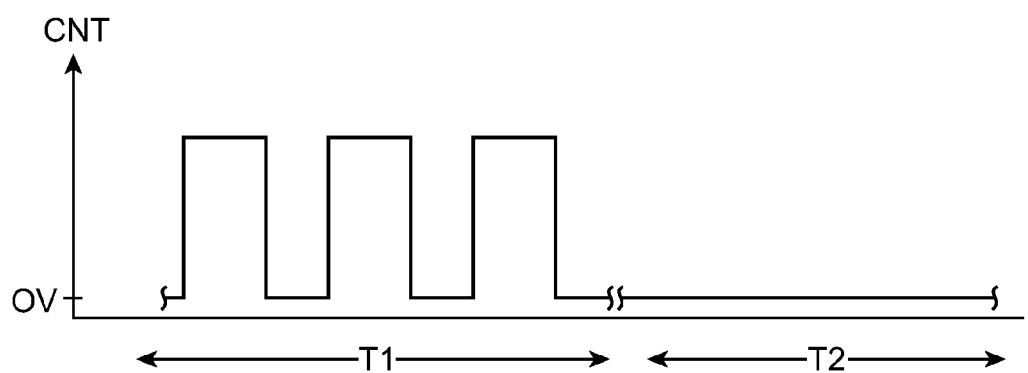
FIG. 5 is a graph showing illustrative pulse-width modulation control signals that may be used in placing power converter circuitry in either a full on or full off state in alternating time periods in accordance with an embodiment of the present invention.

FIG. 5 contains a graph that illustrates how the switch control signal that is used during the low power delivery periods T2 may contain no PWM pulses. In this situation, the power converter may be toggled between a "full on" condition (periods T1) and a "full off" condition (periods T2). In general, either the scheme of FIG. 4 or the scheme of FIG. 5 may be used. In the FIG. 4 arrangement, power is delivered during both the high power delivery and low power delivery periods. In the FIG. 5 arrangement, power is delivered exclusively during the high power delivery periods because power delivery is blocked during the low power delivery periods. A combination of the FIG. 4 and FIG. 5 approaches may also be used.

Control resources that are exclusively provided within the electronic device may also be used to implement pulsed power delivery. With this type of approach, control circuitry in electronic device 10 can use a ripple detector to determine the phase and frequency of the AC signal from AC source 14 (i.e., the locations of peaks PK and valleys VL). In response, the electronic device can control its internal power management circuitry so that more power is drawn during high power delivery periods T1 that are concentrated around peaks PK (FIG. 3) and so that less power (i.e., a non-zero reduced amount of power or no power) is drawn during low power delivery periods T2 that are concentrated around valleys VL between peaks PK (FIG. 3).

In cooperative configurations, power converter 12 and electronic device 10 can communicate to coordinate their actions. As an example, power converter 12 can monitor the signal from AC source 14. After detecting the phase and frequency of the AC line signal, power converter 12 can convey information to electronic device 10 so that device 10 can draw power at appropriate "high" and "low" levels in synchronization with the peaks and valleys of the rectified AC signal, respectively. The information may be conveyed in any suitable format (e.g., as clock synchronization information and time stamps, as synchronizing control beacons, etc.).

Figure 6:
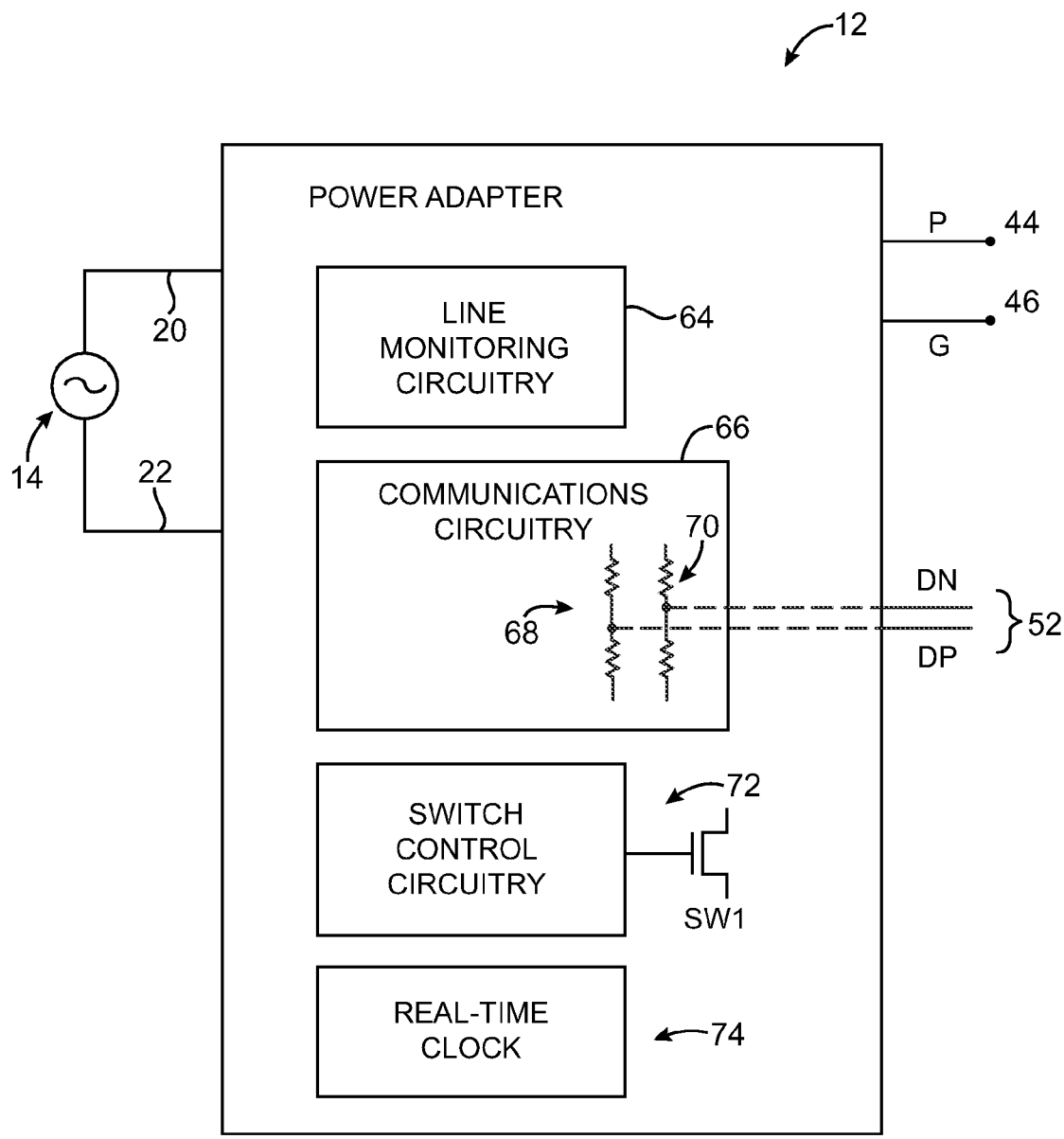
FIG. 6 is a schematic diagram of an illustrative power converter that receives line power from an AC source and that provides pulsed DC power for an electronic device in accordance with an embodiment of the present invention.

An illustrative power converter 12 that includes line monitoring circuitry is shown in FIG. 6. Power converter 12 may receive AC line voltages on lines 20 and 22 and may provide corresponding regulated DC voltages such as a positive voltage P and ground voltage G on output lines 44 and 46, respectively. Line monitoring circuitry 64 in power converter 12 may be used to measure the AC signal on lines such as lines 24 and 26 (FIG. 1) or lines 20 and 22. Based on these measurements, line monitoring circuitry 64 can determine the phase and frequency of the AC signal, either before rectification, after rectification, or both. This allows power converter 12 to determine the locations of peaks PK of FIG. 3 and associated valleys VL between each respective pair of peaks PK.

Communications circuitry 66 may be used to convey information between power converter 12 and device 10. Information may be conveyed unidirectionally (e.g., when power converter 12 is broadcasting information to electronic device 10) or bidirectionally (e.g., to implement handshaking protocols or to respond to requests from electronic device 10, etc.). If desired, communications path 52 may be implemented using the data lines DN and DP associated with a universal serial bus cable that is used to attach electronic device 10 to power converter 12. Lines DN and DP or other data path lines can convey analog information such as resistively coded information or can convey digital information (e.g., digital data that is transferred using universal serial bus protocols or other protocols).

When using a resistive encoding configuration, communications circuitry 66 may include voltage dividers such as resistive voltage dividers 68 and 70. Dividers 68 and 70 may be coupled between a source of positive voltage and ground and may provide analog voltages to lines DN and DP, respectively. These analog voltages may be used to convey information to an attached electronic device concerning the operational capabilities of power converter (e.g., whether converter 12 supports pulsed power, default power handling capabilities, etc.). If desired, transistors or other control circuitry may be used to supply time-varying analog voltages to lines DN and DP (e.g., to initially hold DN and DP at certain constant values to support legacy equipment). These are merely illustrative communications formats. In general, any suitable analog and digital communications techniques and any suitable data path 52 may be used to convey information between power converter 12 and electronic device 10.

Switch control circuitry 72 may be used to generate PWM control signals for switch SW1, as described in connection with FIG. 1. Switch control circuitry 72 may, for example, control switch circuitry SW1 to supply power at both a relatively higher rate (i.e., during high power delivery periods T1) and at a relatively lower rate (i.e., during so-called low power delivery periods T2). In configurations in which regulating circuitry in device 10 dictates the rate at which power is consumed by device 10, switch control circuitry 72 can control switch SW1 so as to produce a relatively constant amount of power. Switch control circuitry 72 may also be controlled in response to control signals from device 10.

Power converter 12 may have clock circuitry that maintains information on the current time (shown schematically in FIG. 6 as real-time clock 74). The clock circuitry may be implemented using a microprocessor or other general purpose circuits or using more dedicated circuits such as timer circuits. Real-time clock 74 may be used to generate time stamps that are indicative of the current phase and frequency of the AC signals from AC source 14. For example, time stamps may be generated by real-time clock 74 that coincide with peaks PK and/or valleys VL (FIG. 3).

Figure 7:
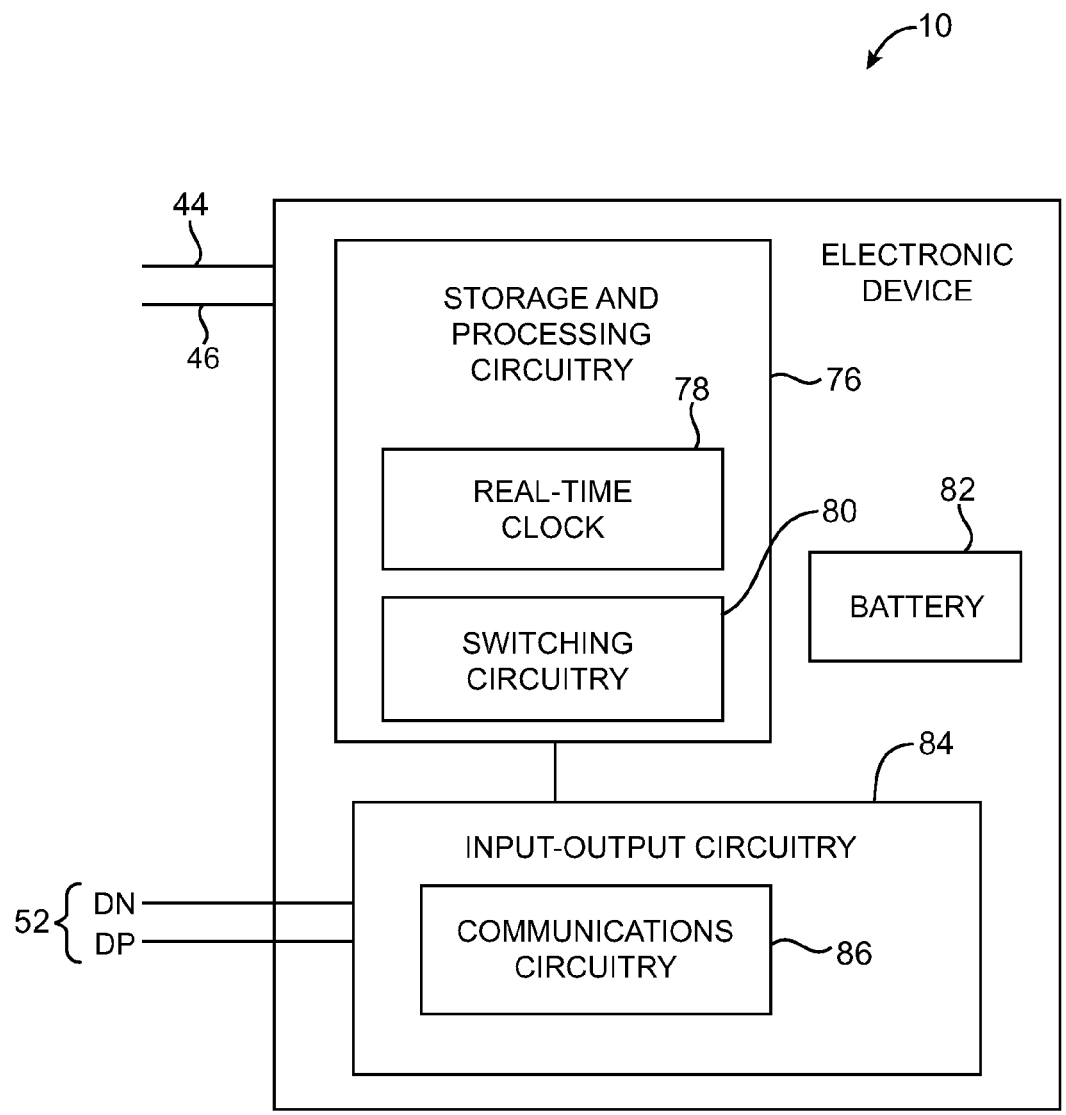
FIG. 7 is a schematic diagram of an illustrative electronic device that may receive pulsed DC power from a power converter of the type shown in FIG. 6 in accordance with an embodiment of the present invention.

An illustrative electronic device 10 that may receive DC power from DC power supply lines 44 and 46 and that may be connected to communications circuitry 66 of power converter 12 by communications path 52 is shown in FIG. 7. As shown in FIG. 7, electronic device 10 may have storage and processing circuitry 76 and input-output circuitry 84.

Storage and processing circuitry 76 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 76 may be used in controlling the operation of device 10. Processing circuitry in circuitry 76 may be based on processors such as microprocessors, microcontrollers, digital signal processors, dedicated processing circuits, power management circuits, audio and video chips, and other suitable integrated circuits. Storage and processing circuitry 76 may be used to run software on device 10, such as operating system software, application software, software for implementing control algorithms, communications protocol software etc. As with power converter 12, storage and processing circuitry 76 of electronic device 10 may include clock circuitry that maintains information on the current time (shown schematically in FIG. 7 as real-time clock 78). The clock circuitry may be implemented using a microprocessor or other general purpose circuits or using more dedicated circuits such as timer circuits in circuitry 76. Real-time clock 78 may be used to generate time information that is used in processing incoming time stamps from power converter 12. For example, clock 78 may be used in synchronizing the time-varying power consumption properties of device 10 to AC line voltage information that is received from power converter 12 in the form of peak and/or valley time stamps (as an example). Using this type of approach, device 10 can adjust its levels of power consumption in real time so that high power delivery periods T1 coincide with peaks PK (FIG. 3).

Input-output circuitry 84 may be used to allow data to be supplied to device 10 and to allow data to be provided from device 10 to external devices. Examples of input-output devices that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through these devices or other suitable input-output circuitry 84. Input-output circuitry 84 may also be used to convey visual or sonic information to the user of device 10. Input-output circuitry 84 may include connectors for forming data ports (e.g., for attaching external equipment such as computers, accessories, etc.). These ports may include, for example, a USB port or 30-pin connector port (which may include USB power and data lines). Lines 44 and 46 and data path 52 may be conductive paths associated with a USB port or a 30-pin connector port or other suitable input-output ports. Communications circuitry 86 may be used to support any suitable analog or digital communications over a path such as path 52. Communications circuitry 86 may communicate with communications circuitry 66 of power converter 12.

As shown in FIG. 7, device 10 may have a battery 82. Switching circuitry 80 or other suitable power management circuitry may be used to regulate the flow of power from power supply lines 44 and 46 to battery 82 and the circuitry of device 10. When sufficient DC power from power converter 12 is available, switching circuitry 80 may be configured to charge battery 82. When electronic device 10 is not connected to power converter 12, switching circuitry 80 may be configured to route power from battery 82 to the circuitry of device 10. In systems in which the amount of transferred power in the high and low power delivery modes is to be regulated by adjusting device 10, switching circuitry 80 may be controlled in real time to draw appropriate amounts of power from lines 44 and 46. For example, switching circuitry 80 may be configured to draw a relatively high amount of power during high-power pulse periods T1 (FIG. 3) and may be configured to draw a relatively low amount of power during low-power pulse periods T2 (FIG. 6). Switching circuitry 80 may be incorporated into a power management unit integrated circuit and/or may be implemented using other power management circuitry (e.g., discrete metal-oxide-semiconductor and/or bipolar transistors that regulate current flow through the circuitry of device 10).

Figure 8:
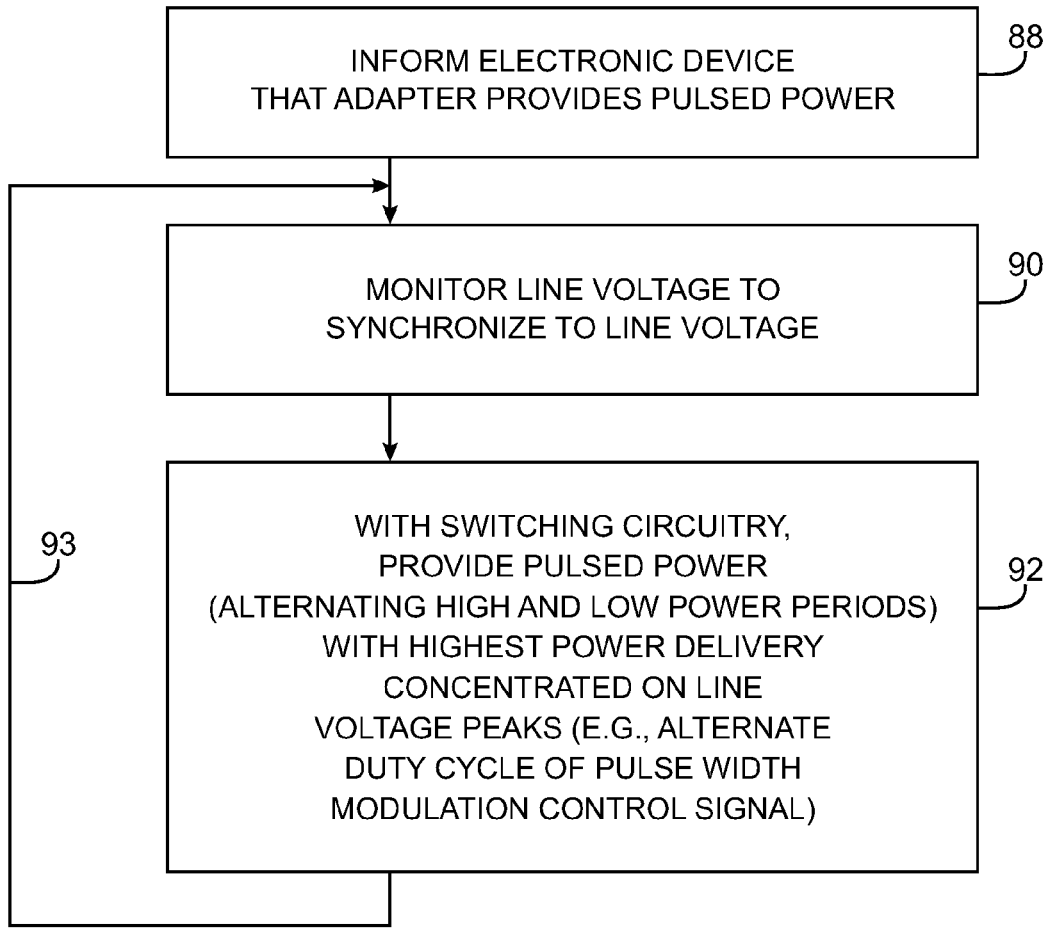
FIG. 8 is a flow chart of illustrative steps involved in operating a power converter to provide pulsed DC power in accordance with an embodiment of the present invention.

A flow chart of illustrative steps involved in implementing a pulsed power scheme of the type shown in FIG. 3 using control resources associated with power converter 12 (FIG. 6) is shown in FIG. 8. At step 88, electronic device 10 may be informed by power converter 12 that power converter 12 is of the type that is capable of providing pulsed power. The operations of step 88 may be performed at any suitable time. For example, the operations of step 88 may be performed when device 10 is first connected to power converter 12. A user may, for example, desire to operate device 10 from line power rather than from battery power. The user can connect device 10 and power converter 12 using a cable. The cable may contain power paths 44 and 46 and signal path 52. The capabilities of power converter 12 can be communicated to device 10 when device 10 and converter 12 are connected using resistor-based codes (i.e., fixed or time varying analog voltage codes), digital codes, etc. By informing device 10 that power converter 12 will be providing pulsed power, device 10 can be placed in a state in which device 10 is prevented from taking undesired actions (e.g., resets, etc.) in response to receiving pulsed power from adapter 12. Device 10 may enter this state automatically in response to receiving the information from converter 12 on its pulsed power capabilities.

At step 90, power converter 12 may use line monitoring circuitry 64 to monitor the AC line voltage from source 14 (e.g., signal Vac on lines 20 and 22, the corresponding rectified version of this signal at the output of rectifier 18 on lines 24 and 26 of FIG. 1 or other appropriate signals). Monitoring circuitry 64 can determine the phase and frequency of the ripples in the AC signal. By analyzing the AC pattern of the monitored AC signal, power converter 12 can determine the location of peaks PK and valleys VL in rectified AC signal.

At step 92, power converter 12 can use the timing information (e.g., phase and frequency information) on the AC source that was gathered at step 90 to deliver high power pulses concentrated on peaks PK of FIG. 3 and low power pulses concentrated on valleys VL of FIG. 3. Power converter 12 may use switch control circuitry 72 to deliver appropriate PWM control signals to switching circuitry SW1 to ensure that the desired "high" and "low" power levels are delivered to device 10. During high periods T1, the DC output voltage Vdc may be monitored using feedback path FB and corresponding control circuitry in adapter 12 may be used to ensure that real-time corrections are made to maintain Vdc at an appropriate level. Feedback of this type may also be used to ensure that the Vdc level is as desired during lower power delivery periods T2. As indicated schematically by line 93, the operations of steps 90 and 92 may be repeated during the operation of power converter 12. For example, the monitoring operations of step 90 may be performed continuously, periodically (e.g., once every few minutes or other suitable time interval), upon occurrence of predetermined criteria, etc.

Figure 9:
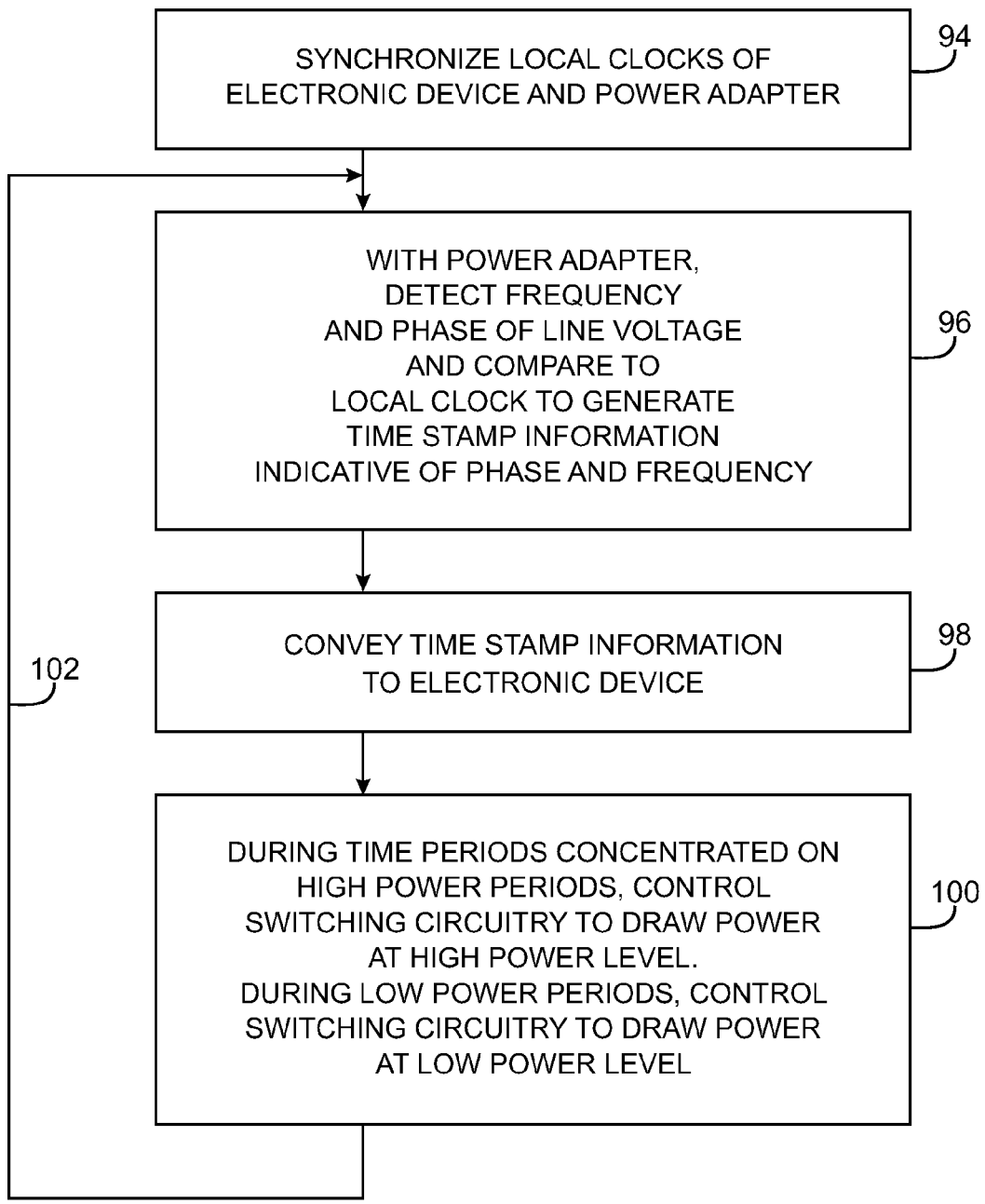
FIG. 9 is a flow chart of illustrative steps involved in using a synchronized clock scheme to operate an electronic device so that the device draws different amounts of power from a power converter at different appropriate time intervals in accordance with an embodiment of the present invention.

A flow chart of illustrative steps involved in controlling the pulsed power delivery scheme using the control resources of both power converter 12 and device 10 is shown in FIG. 9. In the arrangement of FIG. 9, power converter 12 and electronic device 10 exchange information to synchronize real-time clock 74 and real-time clock 76 (step 94). The operations of step 94 may be performed when device 10 is connected to power converter 12.

At step 96, power converter 12 uses line monitoring circuitry 64 to detect the phase and frequency of the AC line signal (e.g., the locations in time of peaks PK and valleys VL of FIG. 3). Power converter 12 uses real-time cock 74 to generate time-stamp information that is indicative of the locations of peaks PK and valleys VL. The time-stamp information may be produced, for example, by determining the times at which peaks PK occur and/or the times at which valleys VL occur.

Time-stamp information such as this may then be conveyed to electronic device 10 over path 52 (step 98).

At step 100, device 10 can use the time stamp information that has been received from power converter 12 to determine the locations of AC signal peaks PK and valleys VL. Based on the known timing for the peaks and valleys in the signal Vcap, electronic device 10 can then control electronic device switching circuitry 80 so that relatively more power is drawn by device 10 over paths 44 and 46 during high-power-delivery periods T1 than during low-power-delivery periods T2.

As indicated schematically by line 102, the operations of steps such as steps 96, 98, and 100 may be repeated (e.g., continuously, periodically, when predetermined criteria have been satisfied, etc.).

Figure 10:
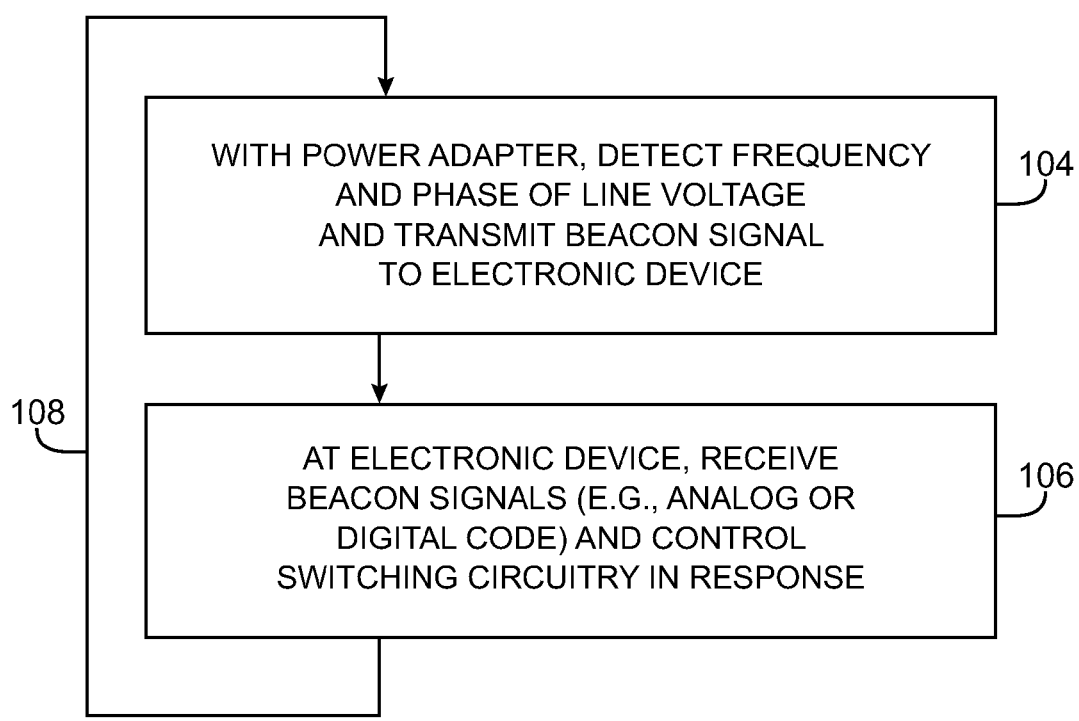
FIG. 10 is a flow chart of illustrative steps involved in using a control beacon scheme to ensure that an electronic device draws different amounts of power from a power converter at different appropriate time intervals in accordance with an embodiment of the present invention.

Another illustrative control scheme for system 8 involves the use of a beacon signal. This type of approach is illustrated in the flow chart of FIG. 10. At step 104 of FIG. 10, power converter 12 may use line monitoring circuitry 64 to detect the phase and frequency of the AC voltage (e.g., the position of peaks PK and valleys VL of voltage Vcap in FIG. 3). Based on this AC signal timing information, power converter 12 may transmit a periodic synchronized beacon to device 10 over path 52 using communications circuitry 66. As an example, power converter 12 can send a first type of beacon code to device 10 in synchronization with peaks PK and/or can send a second type of beacon code to device 10 in synchronization with valleys VL (as an example). The beacon codes may be transmitted using any suitable signaling format (e.g., analog codes, digital codes, etc.). Beacons may be transmitted and received in real time.

At step 106, electronic device 10 may process received beacon signals and may control switching circuitry 80 in response. For example, electronic device 10 may receive beacons using communications circuitry 86 and may use storage and processing circuitry 76 to instruct switching circuitry 80 to draw relatively more power during high-power periods T1 that overlap peaks PK and to draw relatively less power during low-power periods T2 that overlap with valleys VL.

As indicated by line 108, the operations of steps 104 and 106 may be repeated during the operation of power converter 12 and electronic device 10. For example, power converter 12 may continuously transmit beacon signals in synchronization with the AC line voltage and the associated rectified AC signal Vcap while electronic device 106 continuously uses communications circuitry 86 to detect incoming beacons.

If desired, electronic device 10 can autonomously detect the ripple present in the DC power signal (i.e., the small amount of ripple from the rectified version of the AC line voltage that remains on Vdc on paths 44 and 46 after smoothing capacitor 28). This ripple has the same frequency (e.g., 50-60 Hz) and phase as the AC line voltage from source 14 and has a known (e.g., synchronized) phase relationship with the AC line voltage. Accordingly, device 10 can use information on the detected ripple to synchronize its power consumption to AC source 14.

Figure 11:
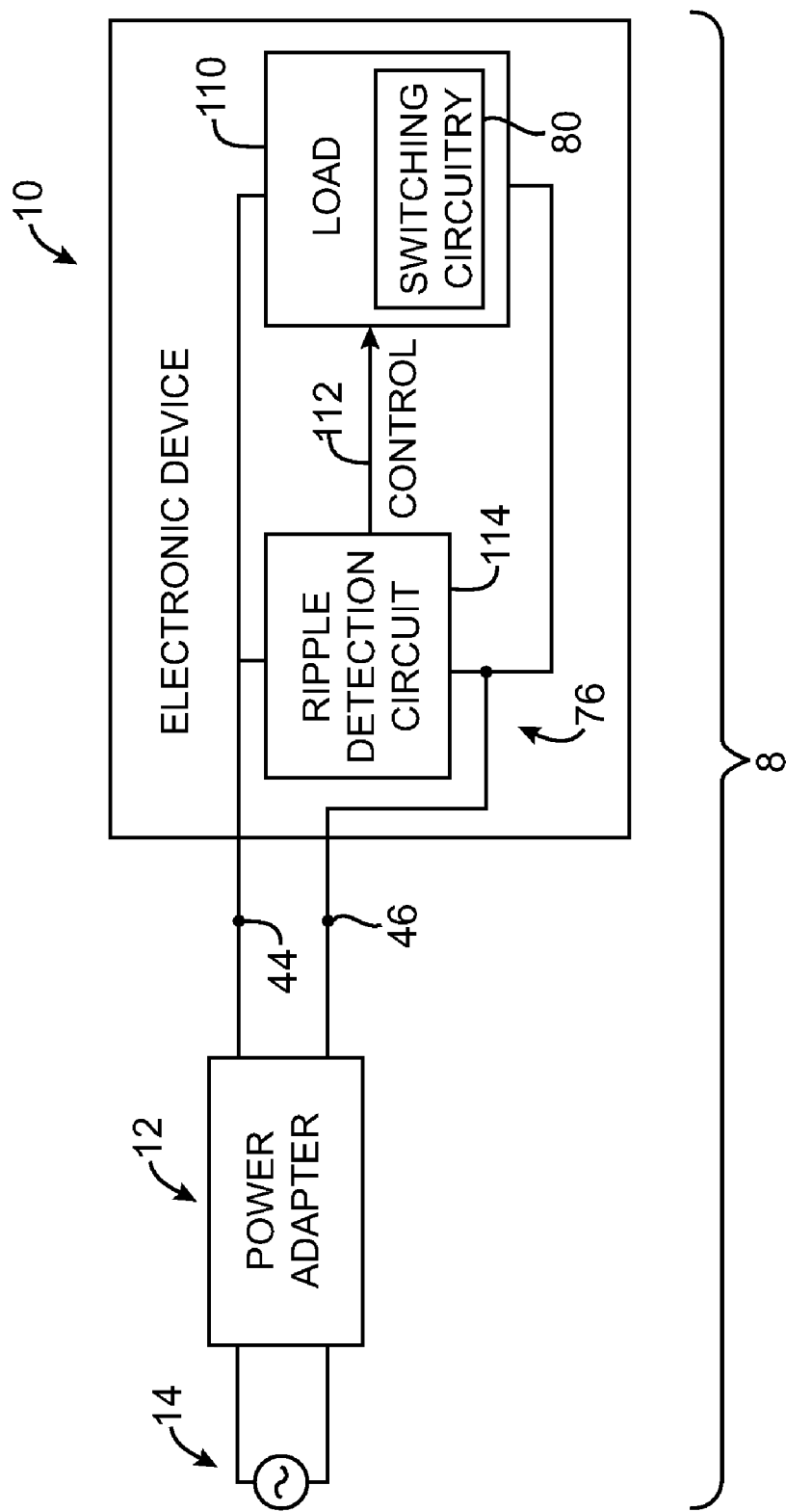
FIG. 11 is a schematic diagram of a system with a power converter and an associated electronic device in which the electronic device uses a ripple detection circuit in determining how to control the electronic device so that the device draws different amounts of power from the power converter at different appropriate time intervals in accordance with an embodiment of the present invention.

FIG. 11 is a circuit diagram showing how electronic device 10 may include ripple detection circuitry such as ripple detection circuit 114 in storage and processing circuitry 76. Ripple detection circuit 114 can monitor the voltage across power delivery lines 44 and 46 and can produce corresponding control signals CONTROL on control path 112. The signals on path 112 may be conveyed to switching circuitry 80. Switching circuitry 80 can control the power consumption of device 10 (e.g., by regulating the flow of current through storage and processing circuitry 76, input-output circuitry 84, and other circuitry in device 10—shown collectively as load circuit 110 in FIG. 11). Switching circuitry 80 may, for example, regulate the power consumption of device 10 so that relatively more power is drawn from power converter 12 over power distribution paths 44 and 46 during high-power delivery periods T1 (FIG. 3) and so that relatively less power is drawn from power converter 12 over power distribution paths 44 and 46 during low-power delivery periods T2 (FIG. 3).

Figure 12:
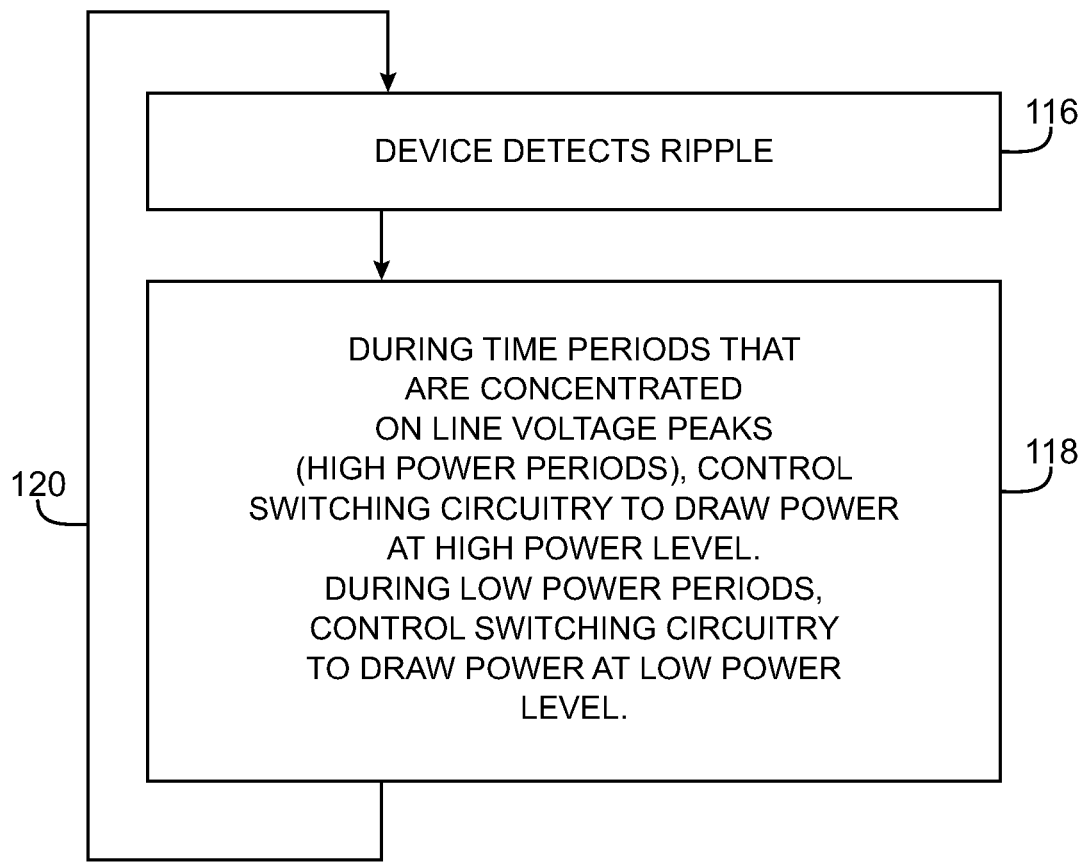
FIG. 12 is a flow chart of illustrative steps involved in using a ripple detection scheme in a system of the type shown in FIG. 11 so that an electronic device draws different amounts of power from a power converter at different time intervals in synchronization with line voltage peaks in accordance with an embodiment of the present invention.

Illustrative steps involved in operating system 8 of FIG. 11 are shown in FIG. 12. At step 116, electronic device 10 may use ripple detector 114 of FIG. 11 to measure the phase and frequency of ripple in the DC power on lines 44 and 46 and thereby determine the timing characteristics (e.g., phase and frequency) of the associated AC line signal (e.g., Vac and Vcap of FIG. 1).

Processing circuitry 76 (FIG. 7) may process the detected timing information on the AC line voltage and may adjust switching circuitry 80 to regulate the power consumption of device 10 accordingly (step 118). During the operations of step 118, switching circuitry 80 may control the amount of power that is consumed by electronic device 10 so that relatively more power is consumed during time periods T1 that overlap AC line voltage peaks PK and so that relatively less power is consumed during time periods T2 that are concentrated around AC line voltage valleys VL (FIG. 3). As indicated by line 120, the operations of steps 116 and 118 may be repeated (e.g., continuously, periodically, when predetermined criteria have been satisfied, etc.).

Although the illustrative power converter 12 of FIG. 1 is shown as including a capacitor 28 that smoothes the rectified AC line voltage, capacitor 28 may, if desired, be omitted. When capacitor 28 is omitted, power converter 12 and/or electronic device 10 can restrict power delivery to periods of peak rectified AC signal (e.g., exclusively to peaks PK of FIG. 3). The use of power converter arrangements in which a smoothing capacitor 28 is used is merely illustrative. Moreover, capacitor 28 may be provided using any suitable number of physical capacitors connected in parallel (e.g., one capacitor, two capacitors, etc.).

Figure 13:
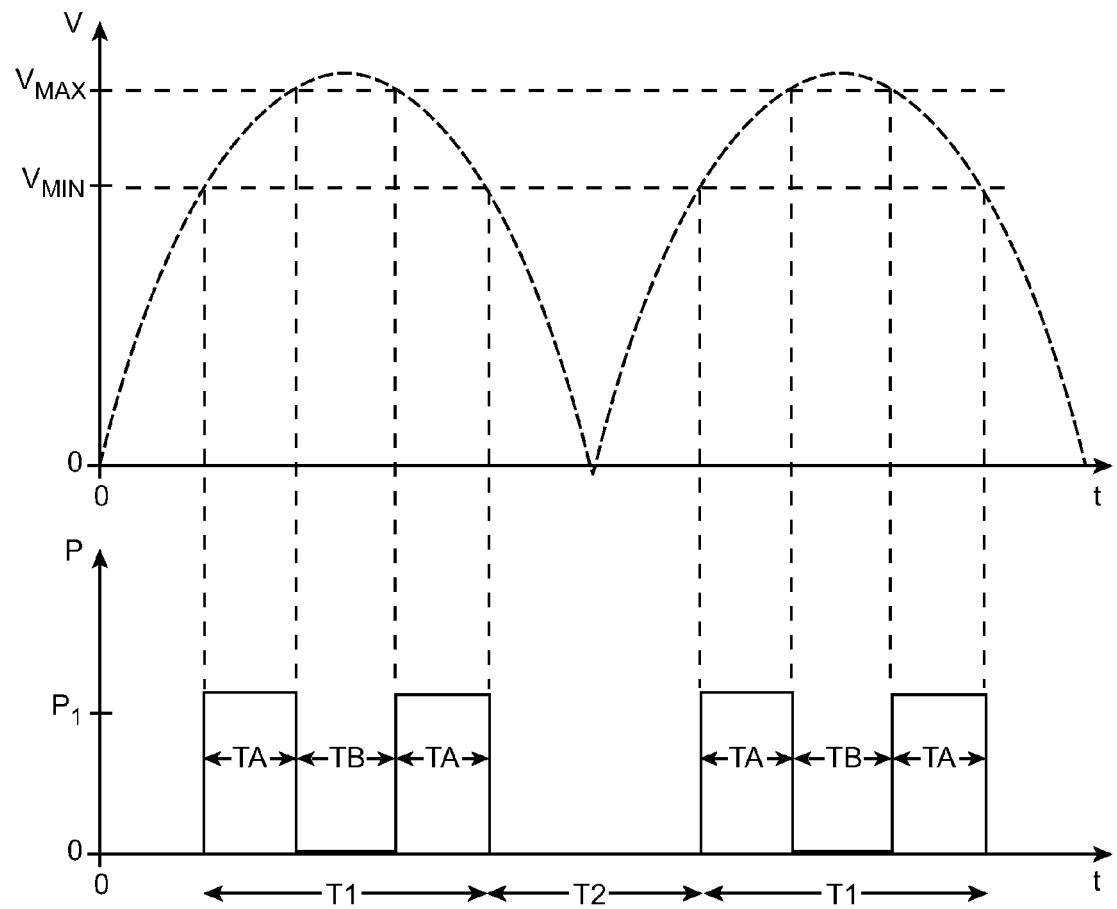
FIG. 13 is a diagram showing how power delivery may be regulated in synchronization with an AC line source to avoid power delivery during particular high-voltage regions in the AC line signal in accordance with an embodiment of the present invention.

If desired, power delivery periods such as periods T1 and T2 may have more than one associated power delivery level. For example, there may be multiple low-power power delivery levels associated with respective subperiods of a given time period T2, as described in connection with dashed line PD in the lower trace of FIG. 3. Another example is shown in FIG. 13. In the FIG. 13 example, the upper trace shows an illustrative rectified AC line voltage and the lower trace shows illustrative power delivery levels that may be used (as controlled by converter 12 and/or device 10). During certain times, voltage V may be below Vmin. During other times, voltage V may be above Vmax. Power conversion may be most efficient during subperiods TA in time period T1 when V is less than Vmax and above Vmin. Conversion inefficiencies may arise when V is less than Vmin due to relatively large currents and may arise when V is greater than Vmax due to switching losses associated with operating the field-effect transistors such as SW1. These regimes may be avoided by including power-off subperiods TB within high-power delivery periods T1. Power delivery may be halted completely within time periods T2 or power may be supplied at one or more low-power levels within periods T2 (as examples).

The foregoing is merely illustrative of the principles of this invention and various modifications can be made by those skilled in the art without departing from the scope and spirit of the invention.

What is claimed is:

1. A power converter that converts alternating current (AC) power to direct current (DC) power at an output, comprising:
    an input that receives an AC line signal;
    a rectifier circuit that rectifies the AC line signal to produce a rectified AC signal having peaks and valleys;
    switching circuitry that switches in response to a control signal to convert the rectified AC signal to a DC signal at an output; and
    control circuitry that supplies the control signal to the switching circuitry to adjust the switching circuitry to deliver the DC power at the output at a first level during first time periods that overlap the peaks and a second level that is less than the first level during second time periods that overlap the valleys.

2. The power converter defined in claim 1 wherein the control signal comprises pulse width modulation signals and wherein the control circuitry provides the pulse width modulation signals to the switching circuitry to control the switching circuitry.

3. The power converter defined in claim 1 further comprising a capacitor coupled across the rectifier circuit.

4. The power converter defined in claim 1 wherein the control circuitry comprises line monitoring circuitry that gathers timing information on the peaks and valleys in the rectified AC signal.

5. The power converter defined in claim 1 further comprising a transformer having a first pair of terminals coupled across the rectifier circuit and a second pair of terminals coupled to the output, wherein the switching circuit is configured to control current flow through the transformer in response to the control signal.

6. The power converter defined in claim 1 wherein the control circuitry is configured to supply the control signal to adjust the switching circuitry so that the second level is zero and no power is delivered during the second time periods.

7. The power converter defined in claim 1 wherein the control circuitry is configured to supply the control signal to adjust the switching circuitry so that the first time periods each contain at least one subperiod with an associated power delivery level that is lower than the first level.

8. The power converter defined in claim 1 wherein the control circuitry is configured to supply the control signal to adjust the switching circuitry so that the first time periods each contain at least one subperiod with an associated power delivery level that is equal to zero.

9. The power converter defined in claim 1 wherein the control circuitry is configured to supply the control signal to adjust the switching circuitry so that the first time periods each contain at least one given subperiod with an associated power delivery level that is lower than the first level, wherein each given subperiod corresponds to times in which the AC line signal is above a predetermined maximum voltage level.

10. The power converter defined in claim 1 wherein the control circuitry is configured to supply the control signal to adjust the switching circuitry so that the second time periods contain multiple subperiods each with a different corresponding power delivery level.

11. A power converter that converts alternating current (AC) power to direct current (DC) power at an output to which an electronic device may be coupled to receive the DC power, comprising:
  a circuit that rectifies an AC line signal to produce a rectified AC signal having peaks and valleys; and
  control circuitry that transmits timing information on the peaks and valleys to the electronic device.

12. The power converter defined in claim 11 further comprising:
  a capacitor coupled across the circuit;
  a transformer having a first pair of terminals coupled across the circuit and a second pair of terminals coupled to the output; and
  line monitoring circuitry in the control circuitry that gathers the timing information on the peaks and valleys.

13. The power converter defined in claim 12 wherein the control circuitry comprises communications circuitry that is configured to transmit the timing information to the electronic device as a periodic beacon.

14. The power converter defined in claim 12 wherein the control circuitry comprises a real-time clock that gathers the timing information on the peaks and valleys.

15. The power converter defined in claim 14 wherein the control circuitry comprises communications circuitry that is configured to transmit the timing information to the electronic device as time-stamp information.

16. An electronic device comprising:
  an input that receives power in the form of direct-current signals;
  input-output circuitry operable to receive commands from a user;
  ripple detection circuitry that monitors the direct-current signals to gather ripple timing information for the direct-current signals; and
  switching circuitry that regulates how much power is drawn by the electronic device from the direct-current signals based on output from the ripple detection circuitry.

17. The electronic device defined in claim 16, wherein the electronic device comprises a portable electronic device, wherein the direct current signals ripple in response to ripple in corresponding alternating-current power converter signals and wherein the ripple detection circuitry is configured to identify peaks and valleys in the direct-current signals.

18. The electronic device defined in claim 17 wherein the switching circuitry is configured to alternate how much power is drawn by the electronic device from the direct-current signals between a first level during first time periods that overlap the peaks and a second level that is less than the first level during second time periods that overlap the valleys.

19. The electronic device defined in claim 17 wherein the switching circuitry is configured to alternate how much power is drawn by the electronic device from the direct-current signals between a non-zero level during first time periods that overlap the peaks and a zero level in which no power is drawn during second time periods that overlap the valleys.

20. A method for operating a portable electronic device, comprising:
  receiving power for the portable electronic device from direct-current signals;
  with communications circuitry in the portable electronic device, receiving timing information on peaks and valleys in the direct-current signals; and
  with power regulating circuitry in the portable electronic device, regulating how much power is drawn by the portable electronic device between a first level during first time periods that overlap the peaks and a second level that is less than the first level during second time periods that overlap the valleys.

21. The method defined in claim 20 wherein regulating how much power is drawn comprises regulating power drawn by the portable electronic device with the power regulating circuitry so that no power is drawn during the second time periods.

22. The method defined in claim 20 wherein receiving the timing information comprises receiving a beacon from a power converter.

23. The method defined in claim 20 wherein receiving the timing information comprises receiving a beacon from a power converter over a universal serial bus cable connected between the portable electronic device and the power converter.

24. The method defined in claim 20 wherein receiving the timing information comprises receiving time-stamped information on timing characteristics of a rectified alternating-current power converter signal.

* * * * *